United States Patent
Kamoi (10) Patent No.: US 11,765,296 B2
(45) Date of Patent: Sep. 19, 2023

(54) INFORMATION PROCESSING SYSTEM, INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keiko Kamoi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/831,957

(22) Filed: Jun. 3, 2022

(65) Prior Publication Data
US 2022/0400184 A1    Dec. 15, 2022

(30) Foreign Application Priority Data

Jun. 11, 2021  (JP) ................. 2021-098269

(51) Int. Cl.
*H04N 1/00*        (2006.01)

(52) U.S. Cl.
CPC ..... *H04N 1/00938* (2013.01); *H04N 1/00029* (2013.01); *H04N 1/00039* (2013.01); *H04N 1/00925* (2013.01)

(58) Field of Classification Search
None
See application file for complete search history.

(56) References Cited

U.S. PATENT DOCUMENTS

| | | | |
|---|---|---|---|
| 10,812,676 B2 | 10/2020 | Kakutani | |
| 2007/0061867 A1* | 3/2007 | Shinohara | G06F 21/6218 726/2 |
| 2014/0211235 A1* | 7/2014 | Taniguchi | G06K 15/1805 358/1.14 |
| 2016/0165080 A1* | 6/2016 | Yamahata | H04N 1/00482 358/1.15 |
| 2018/0183973 A1* | 6/2018 | Kakutani | G06F 3/1203 |
| 2019/0332332 A1* | 10/2019 | Yoshida | G06F 3/1285 |

FOREIGN PATENT DOCUMENTS

| | | | | |
|---|---|---|---|---|
| JP | 2000259378 | * | 9/2000 | G06F 3/12 |
| JP | 2006024094 | * | 1/2006 | G06F 13/00 |
| JP | 2008259014 | * | 10/2008 | H04N 1/00 |
| JP | 2009175884 | * | 8/2009 | G06F 15/00 |
| JP | 4506732 B2 | | 7/2010 | |
| JP | 2010146523 | * | 7/2010 | G06F 3/12 |
| JP | 2018-107768 A | | 7/2018 | |

* cited by examiner

*Primary Examiner* — Beniyam Menberu
(74) *Attorney, Agent, or Firm* — Carter, DeLuca & Farrell LLP (57) ABSTRACT

An information processing system configured to perform setting for an image processing apparatus based on setting edited by an application configured to operate on an information processing apparatus, wherein the system includes a startup unit that acquires a status of the image processing apparatus, downloads setting information for the image processing apparatus, determines whether or not to start up the application, and controls the startup of the application based on results of the determination, wherein the determination is performed based on the status before the setting information download has begun.

11 Claims, 13 Drawing Sheets

|  | Error status | Screen type | Display timing | Corresponding screen number |
|---|---|---|---|---|
| (1) | When a specific screen is open on the operation panel of this device (When functions are being set or registered) | Pattern 1 | Ahead | 424 |
| (2) | The application is connecting for remote setup for another PC | Pattern 1 | Ahead | 424 |
| (3) | When a software with a security protection function such as virus buster is in operation | Pattern 1 | Ahead | 424 |
| (4) | When a device error is occurring | Pattern 1 | Ahead | 424 |

|  | Error status | Screen type | Display timing | Corresponding screen number |
|---|---|---|---|---|
| (1) | When a specific screen is open on the operation panel of this device (When functions are being set or registered) | Pattern 1 | After | 426 |
| (2) | Connecting for remote setup for another PC | Pattern 1 | Ahead | 425 |
| (3) | When a software with a security protection function such as virun buster is in operation | Pattern 1 | Ahead | 425 |
| (4) | When a device error is occurring | Pattern 1 | After | 426 |

|  | Error status | Screen type | Display timing | Corresponding screen number |
|---|---|---|---|---|
| (1) | When a specific screen is open on the operation panel of this device (When functions are being set or registered) | Pattern 2 | After | 427 |
| (2) | Connecting for remote setup for another PC | Pattern 1 | Ahead | 425 |
| (3) | When a software with a security protection function such as virus buster is in operation | Pattern 1 | Ahead | 425 |
| (4) | When a device error is occurring | Pattern 2 | After | 427 |

INFORMATION PROCESSING SYSTEM, INFORMATION PROCESSING APPARATUS, INFORMATION PROCESSING METHOD, AND STORAGE MEDIUM

BACKGROUND OF THE INVENTION

Field of the Invention

The present invention relates to an information processing system, an information processing apparatus, an information processing method, and a storage medium that include a setting value editing application for manipulating the setting information for an image forming apparatus.

Description of Related Art

In recent years, it has become possible to edit the setting values of image processing apparatuses such as multifunction peripherals and the like (referred to below as devices) using an information processing apparatus that is external to the device, and to import the edited setting value data. The edited setting value data can be saved in a format that can be imported onto the device, and it is possible to immediately prepare the desired setting for a customer who is introducing a device for the first time by using these setting values.

Remote UI functions, and setting value editing applications that operate on PCs are examples of methods for editing the setting values for a device using an external information processing apparatus (for example, a PC). For example, a system is known that includes a setting value editing application that is able to appropriately set the devices to be set in the case in which the setting items for the devices to be set have been made setting items that should be set with different setting values for each device (Japanese Patent No. 4506732).

In this way, in a setting value editing application that operates on a PC and that edits the setting values of a device, it is natural that when editing the setting, guard processing is performed according to the device status. For example, when a FAX job is in operation on the device, if the setting values related to the FAX are overwritten, there is a possibility that the device will perform an unexpected operation. Therefore, generally, the receiving processing that receives operations on the device and the processing that applies the setting to the device are exclusively controlled (Japanese Unexamined Patent Application, First Publication No. 2018-107768). It is thereby possible to ensure the operations of each type of job that operates on the device.

However, in a setting value editing application that operates on a PC, there are various timings and units for acquiring the device status. If, provisionally, the acquisition timing is only one time, even if a device status is meant to be deleted after several seconds, it will cause an application startup error, and the user operations will need to be performed again.

In addition, there is a tendency for the number of setting values to increase in multifunction peripherals due to their multifunctionality, and therefore, there are also cases in which downloading the device setting values takes several minutes. In applications that acquire the device status after the download, an application startup error will occur after the user has been made to wait for several minutes. In this case, the time that was needed to download the setting values is wasted, and the setting value editing application is prevented from starting up after the setting values have been downloaded. Therefore, it would be preferable to improve the operability of setting value editing applications.

SUMMARY OF THE INVENTION

The present invention has taken into account the above-explained information, and provides a system in which the operability of a setting value editing application has been improved.

In order to achieve the above-explained objective, an information processing system configured to perform setting for an image processing apparatus based on setting edited by an application configured to operate on an information processing apparatus, the information processing system comprising: a memory storing instructions; and a processor executing the instructions causing the information processing system to: acquire a status for the image processing apparatus; download setting information for the image processing apparatus; determine whether or not to start up the application; and control the startup of the application based on results of the determination, wherein the determination is performed based on the status before the setting information download has begun.

Further features of the present invention will become apparent from the following description of exemplary embodiments (with reference to the attached drawings).

DESCRIPTION OF THE EMBODIMENTS

Below, embodiments of the present invention will be described in detail with reference to the attached drawings. Note that the embodiments below do not limit the inventions according to the claims, and in addition, the necessary elements of the means for solving the present invention are not limited to the entirety of the combinations of characteristics that are explained in these embodiments. Also note that the same reference numbers are applied to the same configurational elements, and descriptions thereof will be omitted.

First Embodiment

Figure 1:
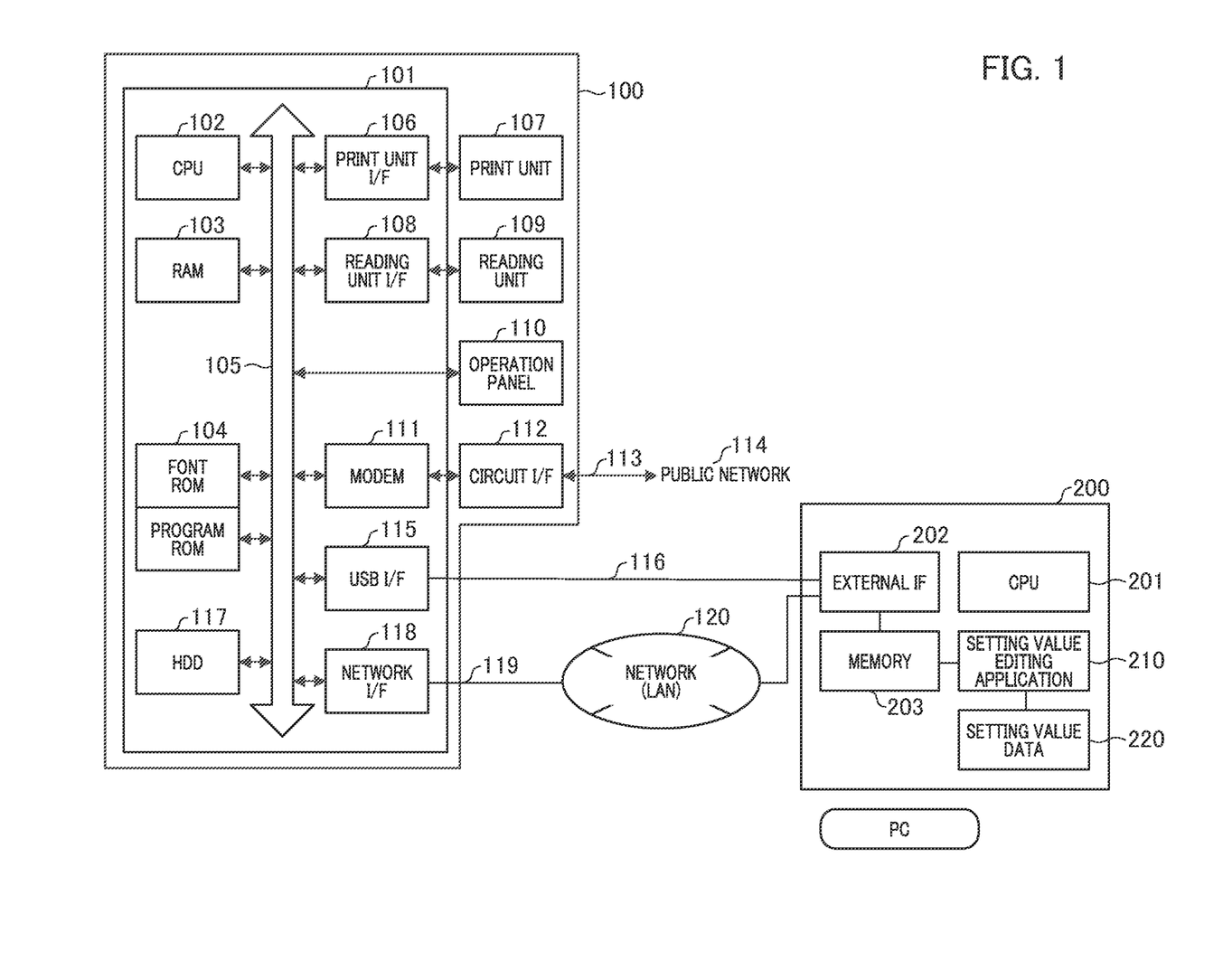
FIG. 1 is a block diagram showing a hardware configuration of an image forming apparatus.

FIG. 1 is a block diagram showing a hardware configuration of an image forming apparatus 100. Each block shows a module. The arrows between each block show the flow of data or commands. Note that the image forming apparatus 100 in the present Embodiment is one example of an image processing apparatus (herein referred to as a device) in an information processing system.

The image forming apparatus 100 is configured by a print unit 107, a reading unit 109, an operation panel 110, a circuit I/F (interface) 112, and a controller 101 that controls these.

The controller 101 includes a CPU 102, a RAM 103, a ROM 104, a print unit I/F 106, a reading unit I/F 108, a MODEM 111, a USB I/F 115, an HDD 117, and a network I/F 118. Each block is connected by a system bus 105. In addition, a font ROM and a program ROM are shown as an example of the ROM 104 in the present Embodiment. However, the configuration of the ROM is not limited thereto.

The CPU 102 performs overall control of each of the blocks according to each type of control program. Each type of control program is executed by a control program, which has been stored in the program area of the ROM 104, being read out. Alternatively, they can also be executed by compressed data that has been stored in the program area of the ROM 104 being decompressed and opened on the RAM 103. In addition, each type of control program may also be saved in a compressed form or a non-compressed form on the Hard Disk Drive (HDD) 117 or an HDD that is not shown.

The network I/F 118 performs communication processing with the host computer (referred to as a PC in the illustrations, and referred to herein as an external apparatus 200 or a PC) via a network (LAN) 120 or the like. The network I/F 118 and the network 120 are connected by a communications cable such as a LAN cable 119 or the like.

The MODEM 111 is connected to a public network 114 via the circuit I/F 112, and performs communications processing with other image forming apparatuses, a FAX device, a telephone, or the like, which are not shown. The circuit I/F 112 and the public network 114 are generally connected by a phone line 113 or the like.

The print unit I/F 106 handles the interface that outputs image signals to the print unit 107 (printer engine). In addition, the reading unit I/F 108 handles the interface that inputs read image signals from the reading unit 109 (scanner engine). Note that although in the present block diagram, a configuration is illustrated in which the reading unit 109 and the print unit 107 are internal to the imaging forming apparatus 100, one or both of the print unit 107 and the reading unit 109 may also be configured to be external.

The CPU 102 processes the image signal that has been input by the reading unit I/F 108, and outputs this to the print unit I/F 106 as a recorded image signal. The CPU 102 uses font information that has been stored in the font area of the ROM 104, displays characters and signs on a display unit of the operation panel 110, and receives command information from the operation panel 110 that receives commands from the user.

The HDD 117 stores device information for the imaging forming apparatus 100, setting values, the user's phonebook information, and unit management information, which are read and written by the CPU 102.

The external apparatus 200 is included in a PC, and includes at least a CPU 201. The CPU 201 performs the execution of the programs for the modules that are internal to the external apparatus 200. An external IF 202 performs communication with other apparatuses. A memory 203 performs storage of the data that enters via the external IF 202, and in addition, temporarily saves the data that is transmitted via the external IF 202. The PC further includes a display unit such as a display or the like that displays designated screens to the user, and an input unit such as a keyboard, a touch panel, or the like for the user to input commands to the PC. Note that the external apparatus 200 in the present Embodiment is one example of an information processing apparatus in an information processing system.

A setting value editing application 210 performs management of the setting values according setting value data 220. Note that the setting value editing application 210 in the present Embodiment is one example of an application in an information processing system. Note that although in the present Embodiment, an example is explained in which the setting value editing application 210 is disposed internally to the external apparatus 200, the present invention is not limited thereto. For example, the setting value editing application 210 may also be a configuration that is saved on a server or the like that is external to the external apparatus 200.

Figure 2:
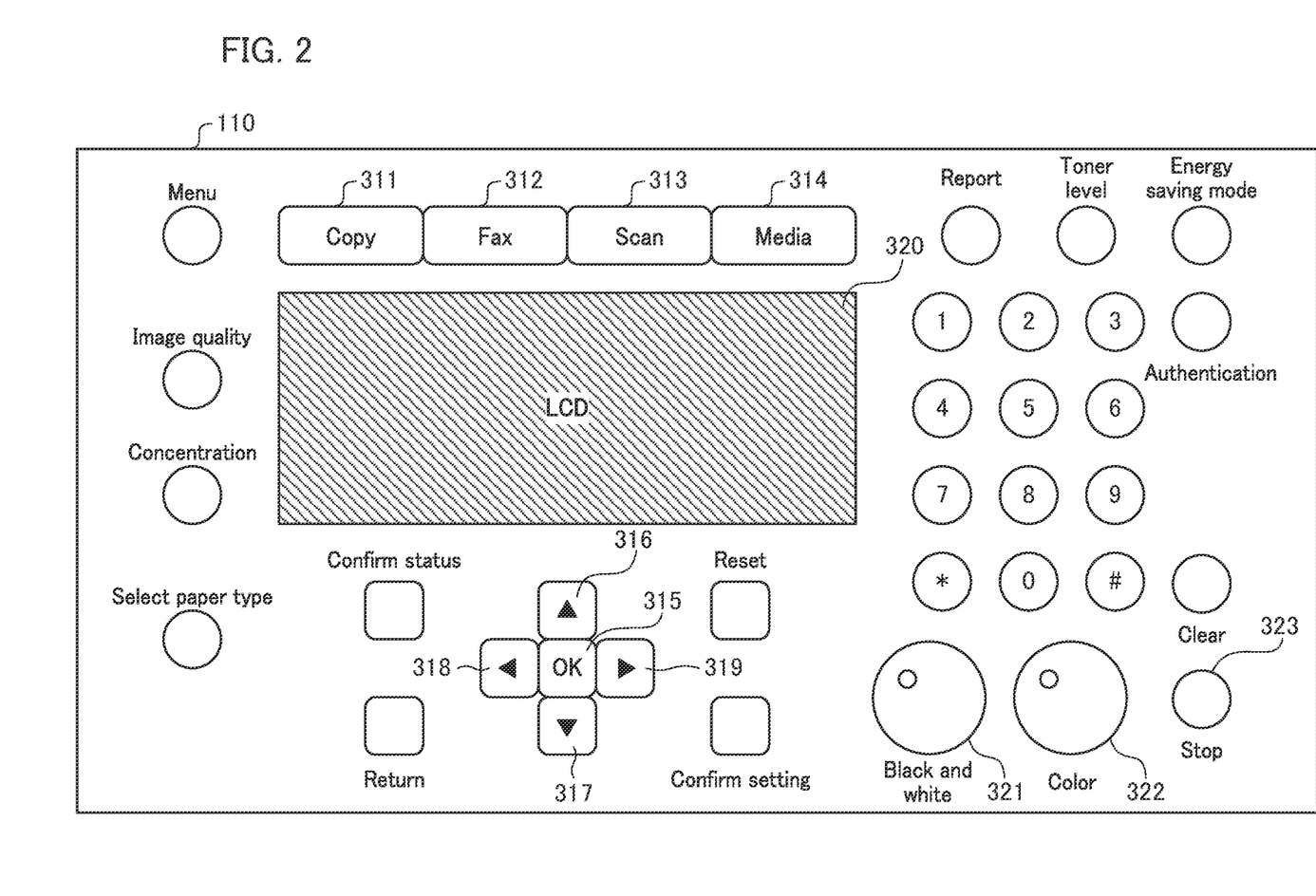
FIG. 2 is a diagram explaining an operation panel.

FIG. 2 is a diagram explaining the operation panel 110. The operation panel 110 of the image forming apparatus 100 includes function keys 311, 312, 313, and 314 for each job corresponding respectively to each of "copy", "FAX", "scan", and "media print". The display transitions to the basic screens for the corresponding jobs by pressing each function key. Each function key lights up when the function corresponding thereto is selected.

An OK key 315 is used when selecting an item. Up/down/left/right arrow keys 316 to 319 are used to move items. A display 320 performs the display of the operation screen. Although in the present Embodiment, an LCD (Liquid Crystal Display) is shown as an example of the display 320, it is not limited thereto. A black and white start key 321 will light up when this start key is able to be pressed. Similarly, a color start key 322 will light up when this start key is able to be pressed. At the time of FAX transmissions, only the black and white start key 321 will light up. A stop key 323 is used to stop jobs, and the like.

Figure 3A:
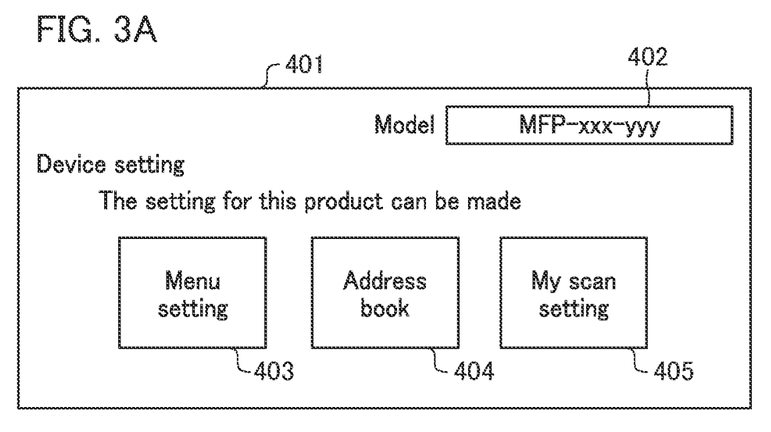
FIG. 3A, FIG. 3B, and FIG. 3C are diagrams showing examples of screens of a setting value editing application.

FIGS. 3A through 5D are examples of screens that are related to the setting value editing application 210. In the present Embodiment, these screens are displayed on the display of the PC. FIG. 3A is a PC application screen 401, and is displayed when an dedicated driver is being installed on the external apparatus 200. The product name of the setting target is displayed in a region 402 on the PC application screen 401.

Three buttons 403, 404, and 405 are disposed on the PC application screen 401. The button 403 starts up an application that is able to edit all of the device setting. The button 404 starts up an application that is only able to edit the address book. The button 405 starts up an application that is only able to edit the "my scan" setting, which are the scan setting that are sent only to the local PC. When the buttons 403, 404, and 405 are pressed, in all of these cases, the same start up processing flow for the setting editing application 210 is entered. In this context, the processing flow for when the button 403 has been pressed will be explained.

Figure 3B:
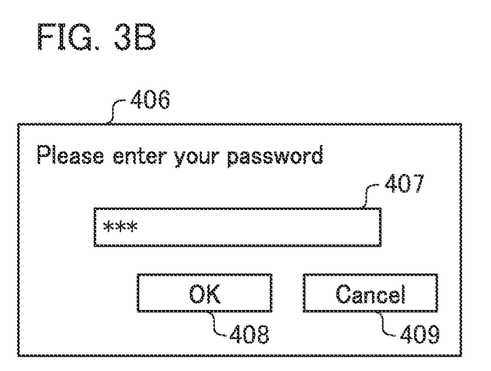

FIG. 3B is a device password input screen 406. When the button 403 is pressed, the startup processing flow for the application that is able to edit all of the device setting is entered, and the display transitions to the device password input screen 406. The password is displayed as ** in an area 407 on the device password input screen 406.

Figure 3C:
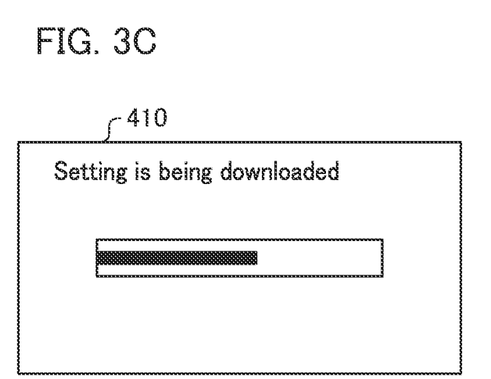

FIG. 3C is a progress bar display screen 410. The progress bar display screen 410 is a screen that shows that the device setting information is being downloaded. The display transitions to the progress bar display screen 410 when an OK button 408 is pressed on the device password input screen 406. The display returns to the PC application screen 401 when a cancel button 409 is pressed on the device password input screen 406.

Figure 4:
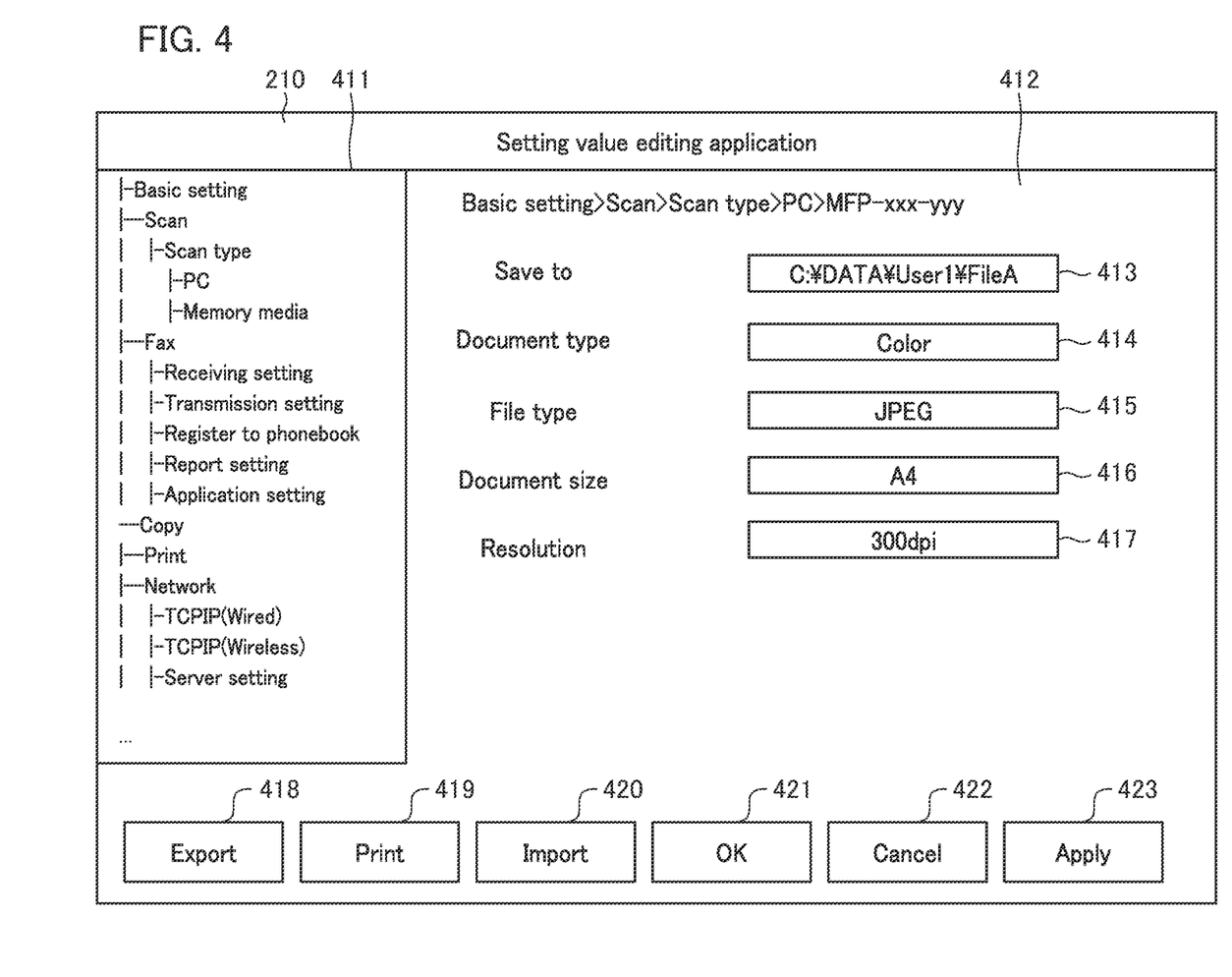
FIG. 4 is a diagram showing an example of a screen of the setting value editing application.

FIG. 4 is a setting value editing application 210 screen. The display transitions to the setting value editing application 210 screen when the download has been completed. A list of the device setting information that has been downloaded is displayed in a field 411 on the screen. The hierarchical names of the setting values are displayed in the field 412, and the items that can be edited are displayed in areas 413 to 417. For example, in the area 413, it is possible to indicate and change a file pass as the location in which scan data will be saved. In the area 414, it is possible to select the type of original document when it is read. The options that are present are "monochrome/color", "color", "monochrome", "monochrome (OCR)", "gray scale", and "color (magazine, catalogue)". In the area 415, it is possible to indicate the file format when saving a file, such as JPEG, TIFF, PDF, or BMP. In the area 416, it is possible to indicate the size of the original document that is being scanned. In the area 417, it is possible to indicate the resolution for the image that is being scanned.

An "export" button 418 makes it possible to save the current setting contents to a file, and the data can be discharged using an dedicated filename extension. A "print" button 419 makes it possible to send print commands for the current setting content list to the device. Printing cannot be performed before an "apply" button 423 is pressed, and it is necessary to click on the "apply" button 423 once and transmit the new data to the device, and then it is necessary to click the "print" button 419. An "import" button 420 makes it possible to load and display the setting contents that have been saved to the file. An "OK" button 421 transmits the contents that have been set to the device, along with ending the setting value editing application 210. A "cancel" button 422 ends the setting value editing application 210 without transmitting the contents that have been set to the device. Although the "apply" button 423 transmits the contents that have been set to the device, continued use without ending the setting value editing application 210 is possible.

Figure 5A:
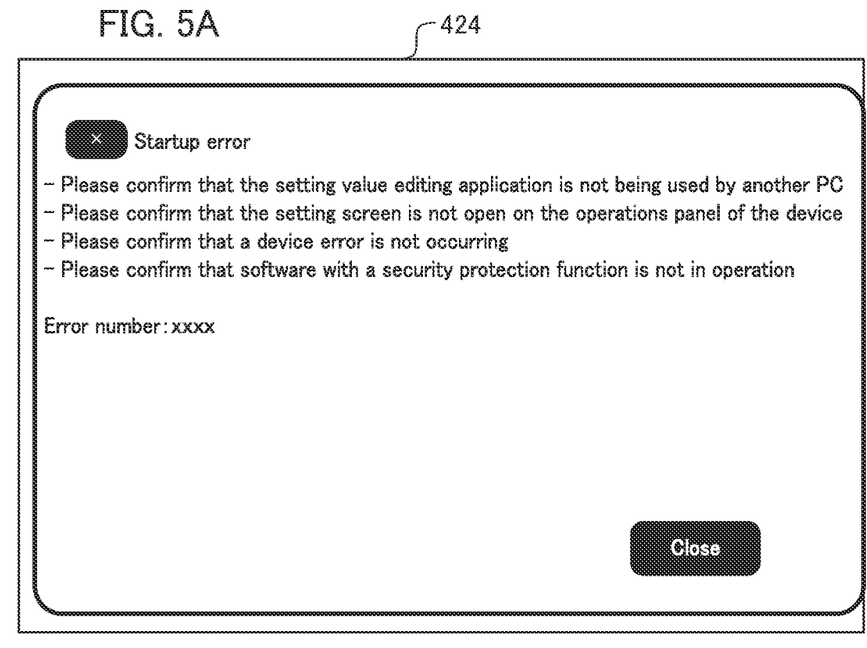
FIG. 5A, FIG. 5B, FIG. 5C, and FIG. 5D are diagrams showing examples of error screens for the setting value editing application.
Figure 5B:
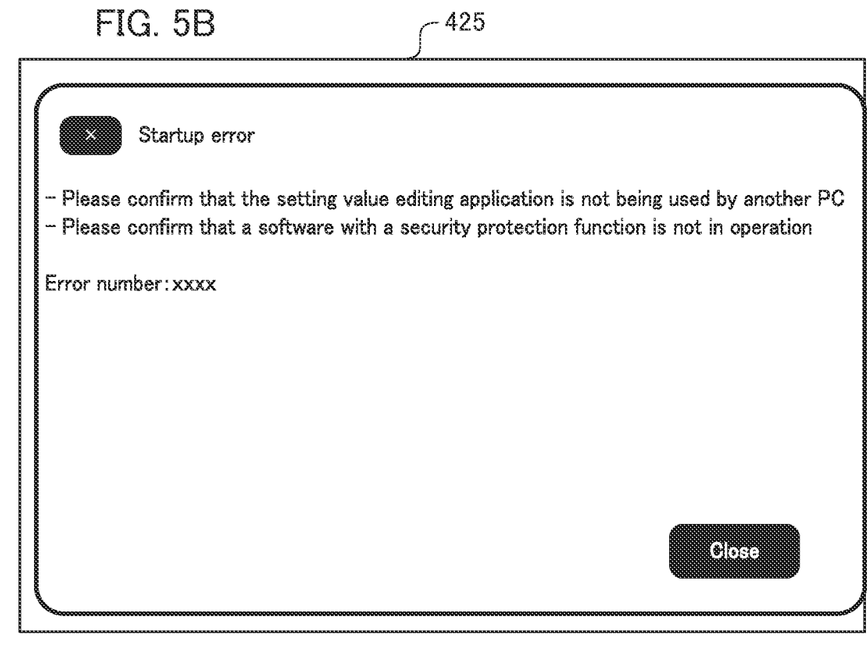
Figure 5C:
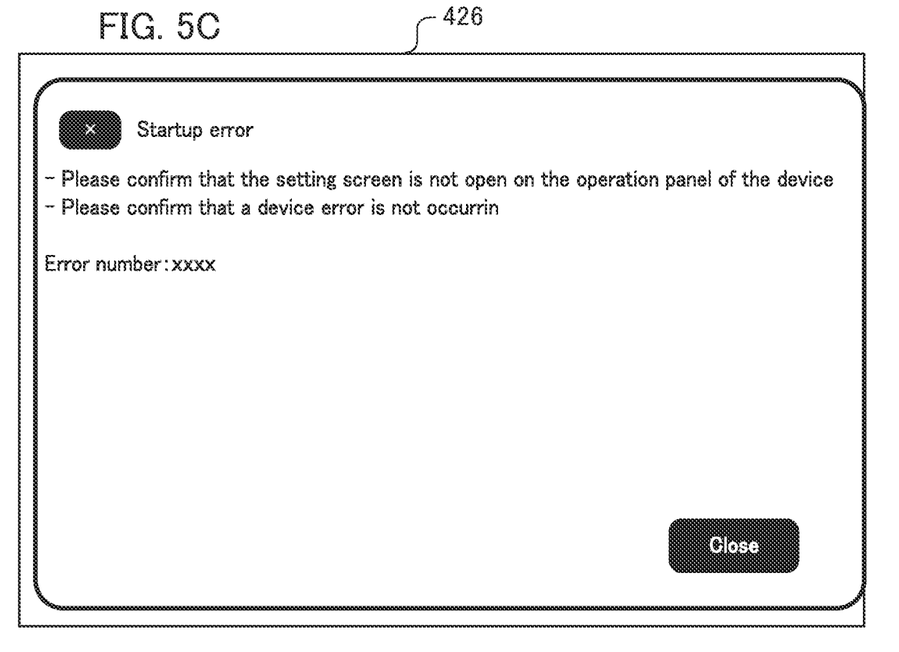
Figure 5D:
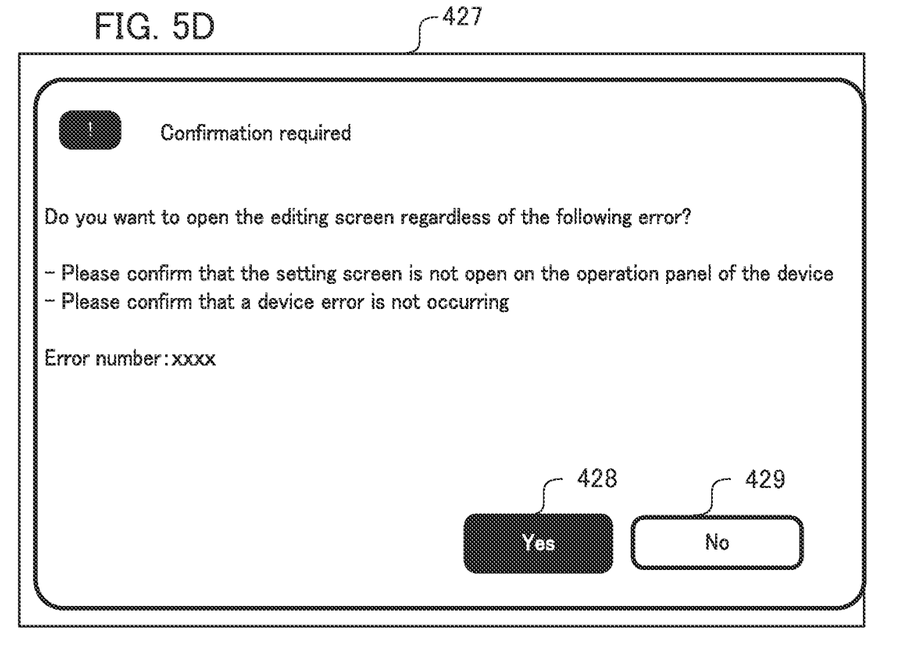

Next, examples of error screens that are displayed during the startup processing flow for the setting value editing application 210 will be shown. FIG. 5A, FIG. 5B, FIG. 5C, and FIG. 5D are diagrams that show examples of error screens for the setting value editing application 210. Specifically, they are screens on which reasons for startup errors for the setting value editing application 210 are displayed, or confirmation screens that are shown at the time of an error. A startup error for the setting value editing application 210 is output in the case in which, for example, even though editing has been performed using the setting value editing application 210, the contents of this editing cannot be applied to the device setting information. Specifically, screen 424 of FIG. 5A, screen 425 of FIG. 5B, and screen 426 of FIG. 5C are examples of each type of error being displayed. Screen 427 in FIG. 5D is a screen that confirms whether or not startup of the editing screen for the setting value editing application 210 is possible when an error occurs, and displays a "yes" button 428, and "no" button 429. Each screen is displayed along with an error number.

The contents that are displayed on each screen will be explained along with the Embodiments to be described below.

Figure 6A:
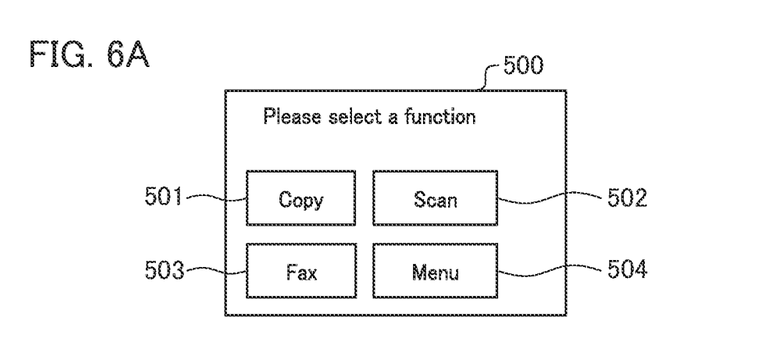
FIG. 6A, FIG. 6B, FIG. 6C, and FIG. 6D are diagrams showing examples of UI screens on the device side.

FIG. 6A, FIG. 6B, FIG. 6C, and FIG. 6D are diagrams that show examples of UI screens on the device side. The same figures show a UI (User Interface) screen on the operation panel 110 of the image forming apparatus 100. FIG. 6A is an example of a top screen 500 on the operation panel 110. The top screen 500 displays the buttons for each function on a device chip screen. Button 501, button 502, and button 503 respectively show copy, scan, and FAX, and the display transitions to the function screen for each function by each type of button being pressed. A button 504 is the device menu, and transitions the display to a menu screen 503 to be described below.

Figure 6B:
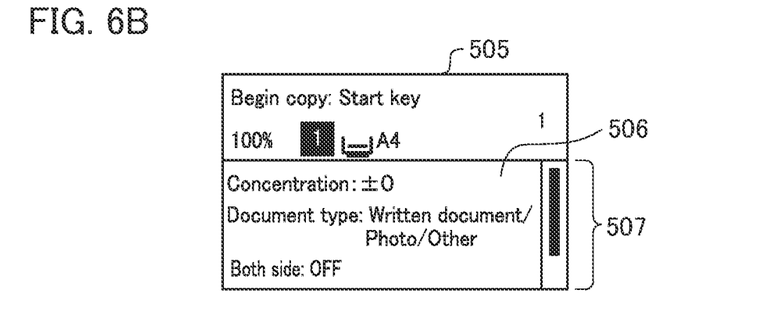

FIG. 6B is a screen 505 for the copy function on the operation panel 110. The screen 505 is a basic copy screen and is configured by 5 rows, wherein the first row displays the current status. The second row displays the current setting status. The third row is the input location for the copy concentration, and it is possible to change this by pressing the input location. The third row to the fifth row display an item 506 for the operation modes that are selectable for a copy job. In the case in which all of the items cannot be displayed, they are configured so as to be able to be displayed by scrolling, and a scroll bar 507 is displayed on the right side.

Figure 6C:
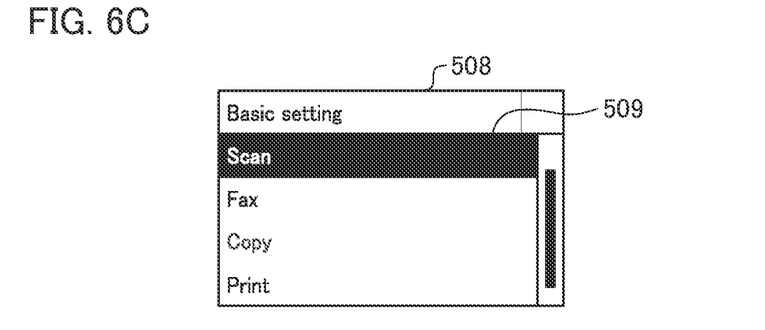
Figure 6D:
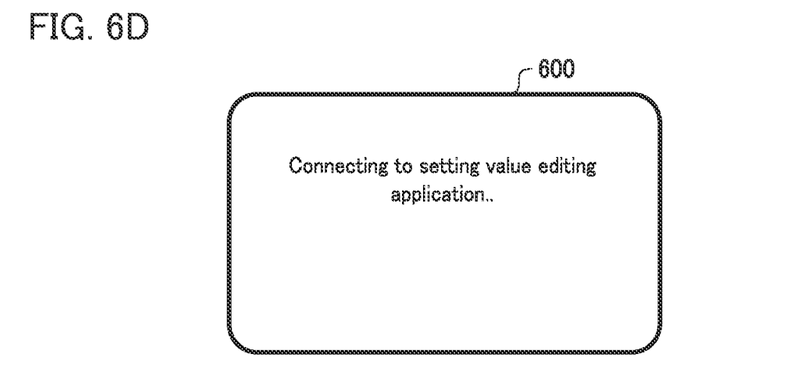

FIG. 6C is a menu screen 508. The basic setting is displayed in the title items, and setting 509 that are related to the scan function are displayed in the menu items. FIG. 6D is a popup screen 600 that shows that the setting value editing application 210 is connected. It covers the entire operation panel 100, and locks operations on the device side.

Figure 7:
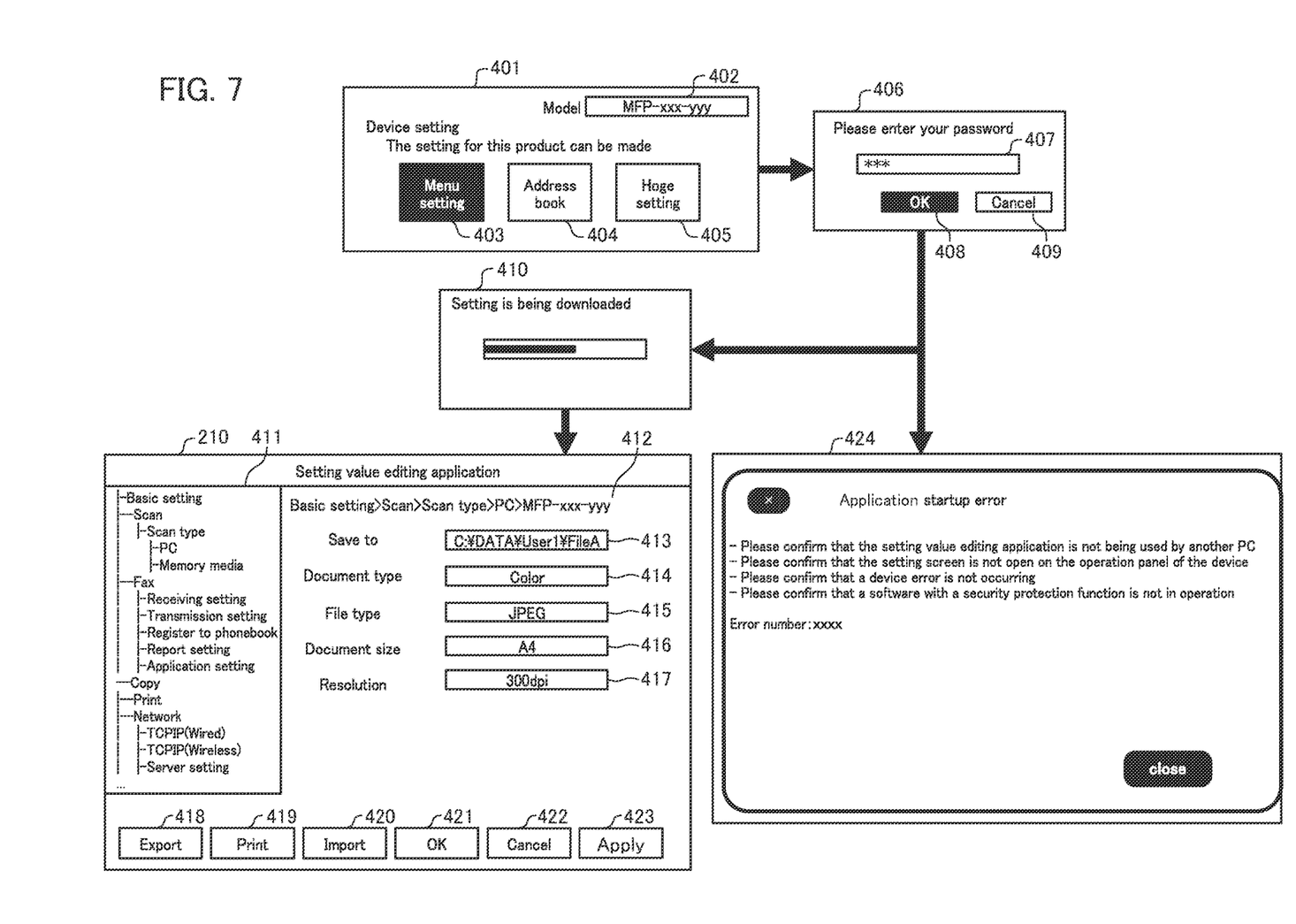
FIG. 7 is a screen flow diagram for the setting value editing application.

FIG. 7 is a diagram showing the screen flow for the setting value editing application 210. FIG. 7 shows the flow of the application screens up until the setting value editing application 210 starts up. As is shown in FIG. 7, in the first Embodiment, screen transitions are performed in the following manner: FIG. 3A→FIG. 3B→FIG. 5, or FIG. 3A→FIG. 3B→FIG. 3C→FIG. 4. Note that the details of the screen transitions in the other Embodiments will be explained together with the flowcharts for each of the Embodiments.

Figure 8A:
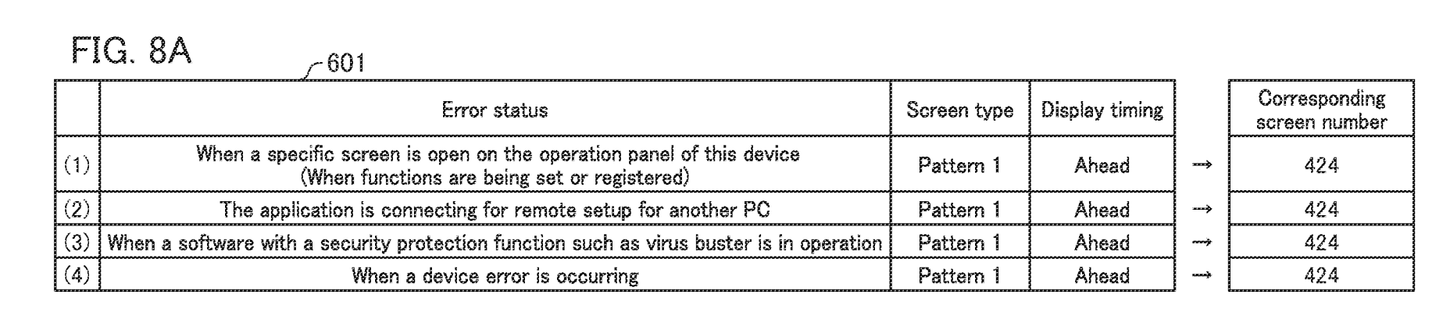
FIG. 8A, FIG. 8B, and FIG. 8C are diagrams showing a list of device statuses that the setting value editing application references.
Figure 8B:
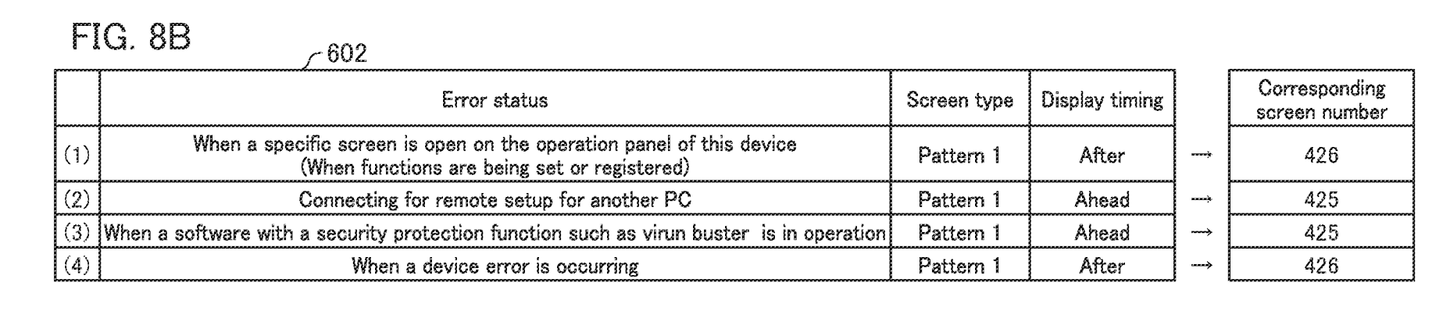
Figure 8C:
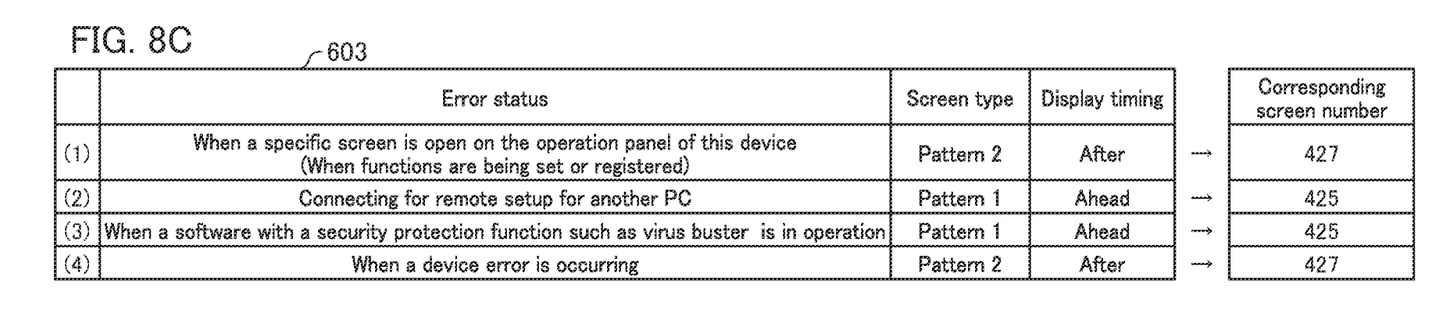

FIG. 8A, FIG. 8B, and FIG. 8C are diagrams showing lists of the device statuses that are referenced by the setting value editing application 210. FIG. 8A, FIG. 8B, and FIG. 8C are list tables of the device statuses that the setting value editing application 210 references. These list tables regulate the screen type that should be displayed and the display timing for each type of error status. The setting value editing application 210 changes to the display of an error screen after referencing these list tables. In the first Embodiment, the setting value editing application 210 references the list table 601 in FIG. 8A. In contrast, in the second Embodiment, which is to be described below, the setting value editing application 210 references the list table 602 in FIG. 8B, and in the third Embodiment, references the list table 603 in FIG. 8C. The details will be explained together with the flowcharts for each Embodiment. Note that the list tables shown in FIG. 8A through FIG. 8C in the present Embodiment are one example of the lists in an information processing system. The list tables are stored as data in the memory 203 of the external apparatus 200, or in other storage units. The list tables are referenced appropriately by the CPU 201, and the like, which controls the startup of the setting value editing application 210.

Figure 9:
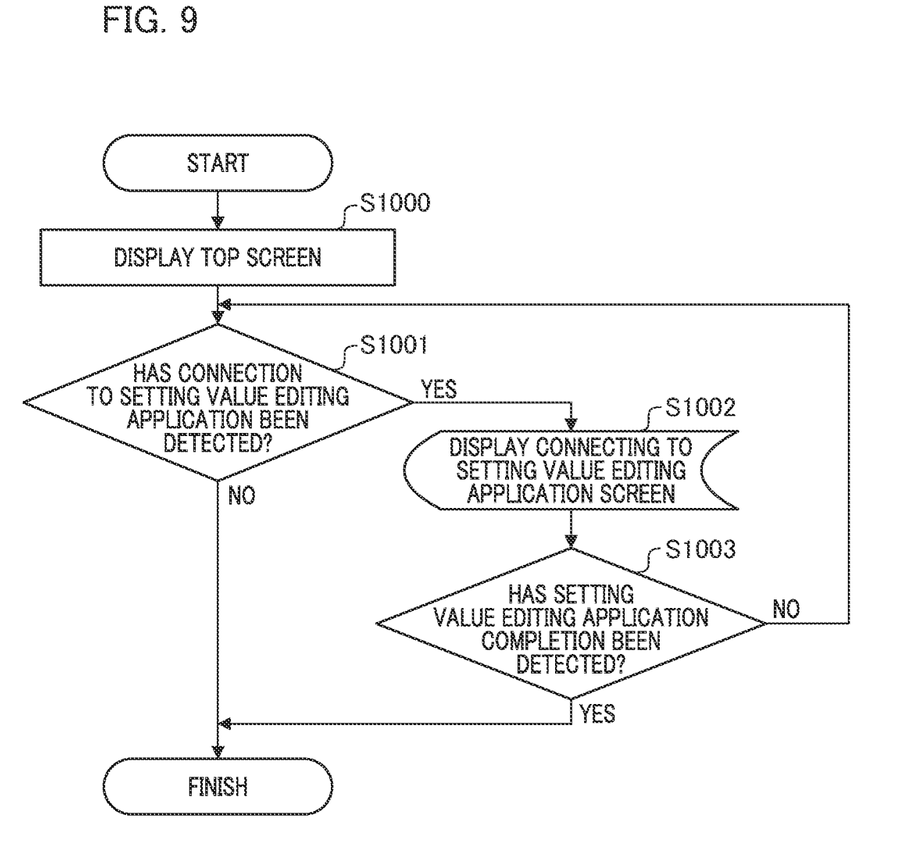
FIG. 9 is a flowchart for the device side according to a first embodiment.

FIG. 9 is a flowchart for the device side according to the first Embodiment. The processing that is shown in this flowchart is executed by the CPU 102 using a program that has been stored on either of the ROM 104, or the RAM 103 of the image forming apparatus 100.

After the power is turned on for the image forming apparatus 100, the top screen 500 is displayed on the operation panel 110 (S1000). The connection of the setting value editing application 210 is detected while in the state in which the top screen 500 is shown (S1001). If a connection is detected, in S1002, the popup screen 600, which shows that the setting value editing application is connected, is displayed. After this, when it is detected that the setting value editing application 210 has ended (S1003), the display returns to the top screen 500.

Figure 10:
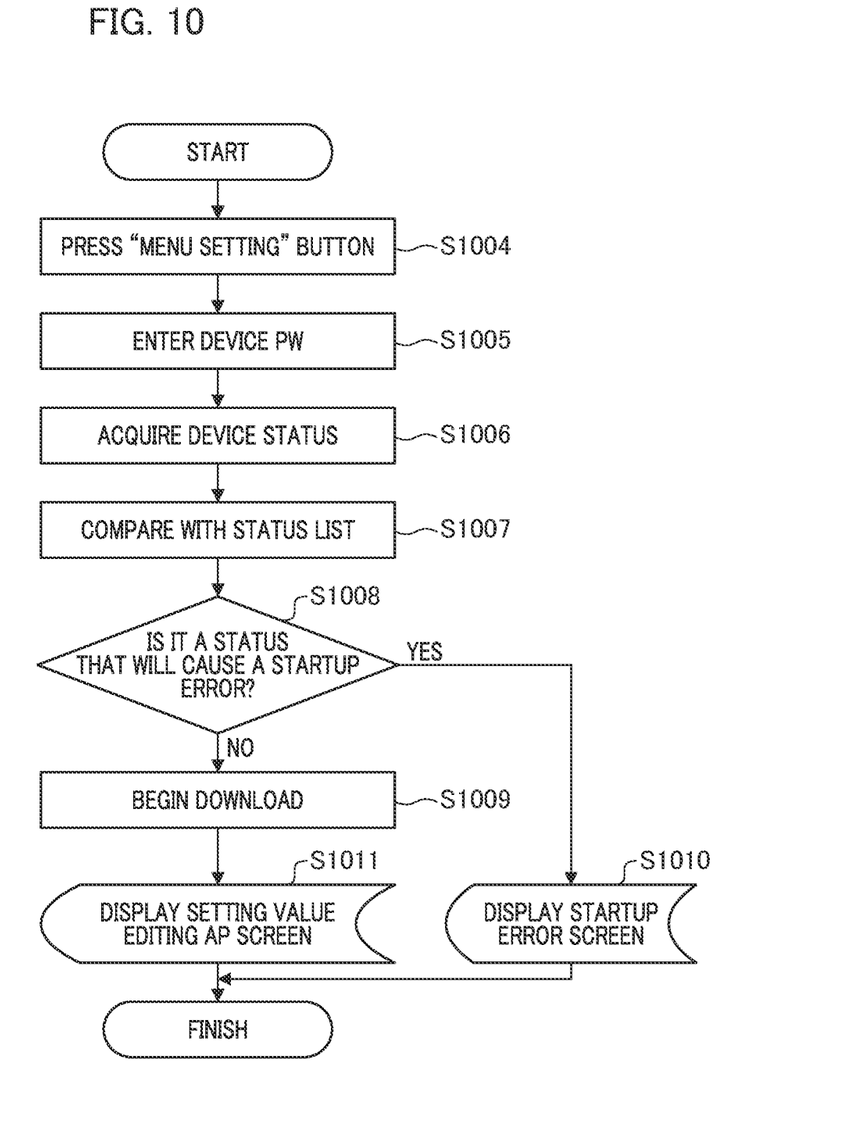
FIG. 10 is a flowchart for the setting value editing application side according to the first embodiment.

FIG. 10 is a flowchart for the setting value editing application 210 side according to the first Embodiment. The processing that is shown in this flowchart is executed by the CPU 201 on the external apparatus 200. In the present embodiment, in order to attain this, the CPU 201 acquires the device status, and downloads the device setting information to the external apparatus 200. In addition, in the present Embodiment, the CPU 201 determines whether or not to start up the setting value editing application 210, and controls the startup of the setting value editing application 210 based on the results of this determination.

In S1004, when the button 403, which reads "menu setting", is pressed, in S1005, the device password input screen 406 is displayed. When the device status is acquired in S1006, the application references the status list table 601 in FIG. 8 (A) in S1007, and confirms the screen type that should be displayed and the display timing for each type of error status. In this context, the display timing for each error status in FIG. 8 (A) are all "ahead". This means that it is a list of error statuses that should be referenced "before" the device setting information download processing is started.

In S1008, if it is determined that the screen type for the acquired status is a pattern 1, along with determining that the setting value editing application 210 should not be started up, in S1010, the screen 424 is displayed from among the error screens. In the case in which the acquired status is not in the list table 601, the processing proceeds to S1009, the download processing is started, and the display screen 410 is displayed. When the download has completed, the setting value editing application 210 screen is displayed (S1011).

According to the first Embodiment, by acquiring the status of the device before downloading the device setting information, the user is able to understand the reason for the application startup error without performing an unnecessary download. Thus, the operability of the setting value editing application is able to be improved.

Second Embodiment

A second Embodiment according to the present invention will now be explained. In the second Embodiment, an example will be given in which the setting value editing application 210 acquires the device status two separate times, before the start of the device setting information download, and after it has been completed.

In the first Embodiment, whether or not the application should be started up is determined using the results of acquiring the device status only once, before the download begins. Therefore, in the case in which the device setting information download takes several minutes, even if an error will be resolved after a set amount of time has passed, this status cannot be taken into consideration. For example, there are cases in which the user uses the copy directly after the startup of the setting value editing application 210, and the basic copy screen 505 is displayed on the operation panel 110 of the device, resulting in the device status corresponding to an error status. However, in the case in which the time that the user uses the device for is a few seconds, when the user leaves the device, it is also possible that the display will return to the top screen 500 after the time out period has passed. In this way, it is not necessarily the case that the device status will correspond to an error status after the download has been completed.

In such a case, if it is made possible to normally start up the setting value editing application 210 after the device setting information download has been completed, it is possible to reduce the frequency of startup errors. In this way, the second Embodiment is characterized by the point of performing the startup determination for the setting value editing application 210 taking into consideration the possibility of the device status changing when a set period of time has passed.

Figure 11:
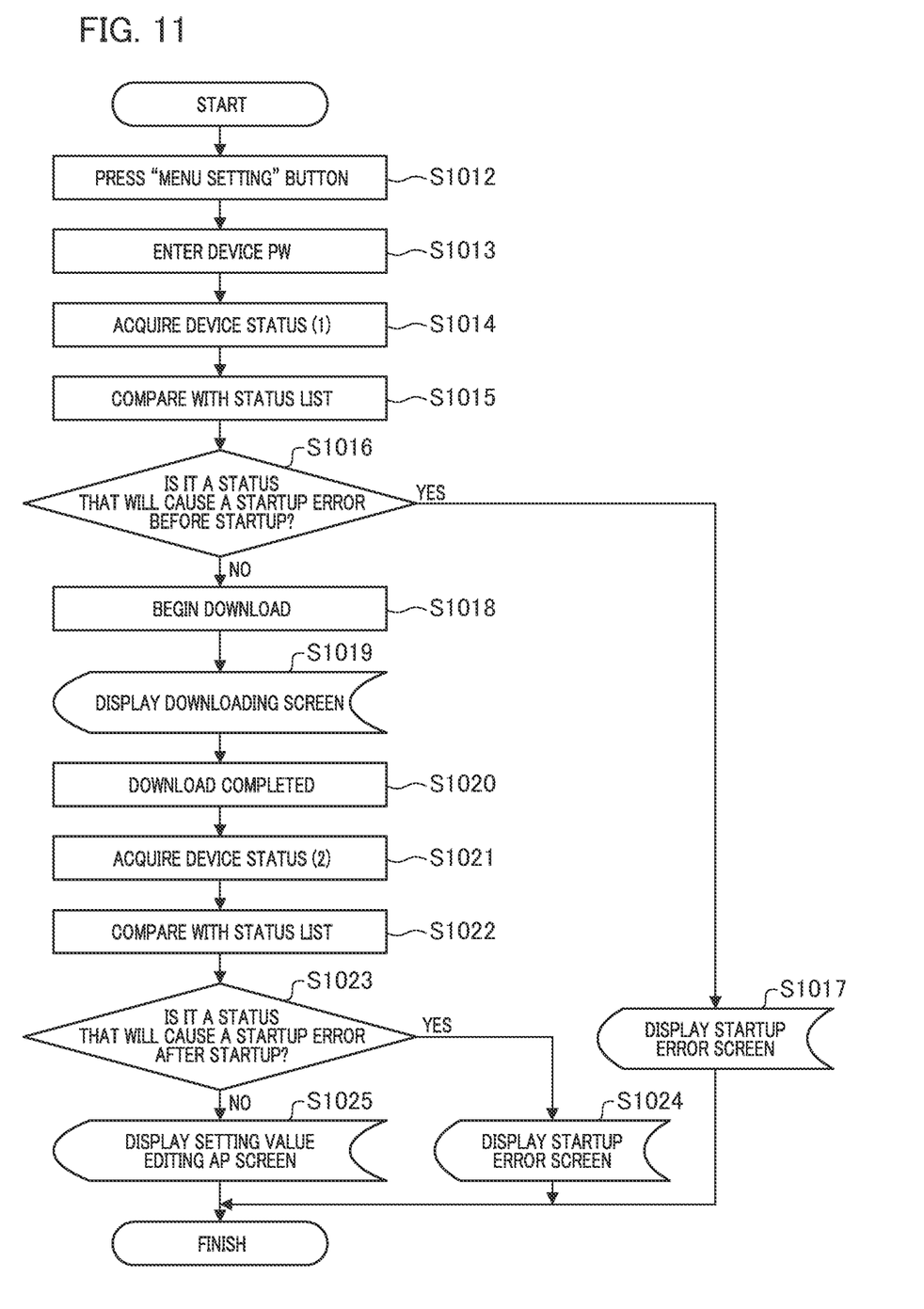
FIG. 11 is a flowchart for the setting value editing application side according to a second embodiment.

FIG. 11 is a flowchart of the setting value editing application 210 side according to the second Embodiment. The processing that is shown in this flowchart is executed by the CPU 201 on the external apparatus 200.

The processing flow from S1012 up until S1015 is the same as that of S1004 to S1007 in the first Embodiment, and therefore, explanations thereof will be omitted. Note that the device side flowchart is also the same as the processing flow for the first Embodiment, and therefore an explanation thereof will also be omitted.

The processing flow for S1016 and after in FIG. 11 will now be explained. In S1016, the device status that was acquired the first time is compared to the status list table 602 in FIG. 8B. In this context, the screen type that should be displayed and the display timing for each type of error status are confirmed. The display timing being "ahead" is an error status that should be compared to the list before the download is started. If it is determined that the screen type for the acquired status is a pattern 1 in S1016, in S1017, the screen 425, which shows an error, is displayed. In contrast, in the case in which, as a result of the comparison with the status list table 602 in FIG. 8B, the display timing is "after", or, in the case in which there is no corresponding status, the processing proceeds to S1018.

In S1018, the download processing is started, and in S1019, the display screen 410 is displayed. When the download has completed in S1020, the device status is acquired a second time (S1021).

In S1022, the status is compared to the status list table 602 in FIG. 8B again. In this context, the screen type that should be displayed, and the display timing for each type of error status are confirmed again. The statuses for which the display timing corresponds to "after" are error statuses that should be compared to the list after the download has been completed. If it is determined in S1023 that the acquired status is a pattern 1, the screen 426, which shows a startup error, is displayed in S1024. In the case in which the acquired status is not present in the list table 601, the processing proceeds to S1025, and the setting value editing application 210 screen is displayed.

According to the second Embodiment, the device status is acquired twice, before the device setting information download is started, and after the download has been completed, and the appropriate application startup determination is made at the appropriate timing. It is thereby possible to lower the frequency at which startup errors for the setting value editing application 210 operating on the PC occur.

Thus, it is possible to improve the operability of the setting value editing application 210.

Third Embodiment

A third Embodiment according to the present invention will now be explained. In the third Embodiment, an example will be shown in which, even in a case in which there should be a startup error as a result of, for example, the results of the comparison with the status list table 602, it is possible to start up the setting value editing application 210 based on results that have been acquired from the user.

In the first Embodiment and the second Embodiment, it is possible to reduce the frequency of startup errors for the setting value editing application 210 by appropriately acquiring the device status. In contrast, as long as the device status is not released from the error status state, the setting value editing application 210 cannot be started up by operations on the side of the external apparatus 200.

However, as was shown in FIG. 4, the setting value editing application 210 includes a function that allows user operations without transmitting data to the device. The "export" button 418, which makes it possible to save the current setting contents in a file, and the "import" button 420, which makes it possible to load and display the setting contents that are saved in the file, are examples of this function. Furthermore, it is also possible to make the data editing itself of the setting value editing application 210 be operated independently from the device status. The third Embodiment is characterized by the point that, in order to use a portion of the functions of the setting value editing application 210, the startup determination for the setting value editing application 210 is performed based on results that have been acquired from the user.

Figure 12:
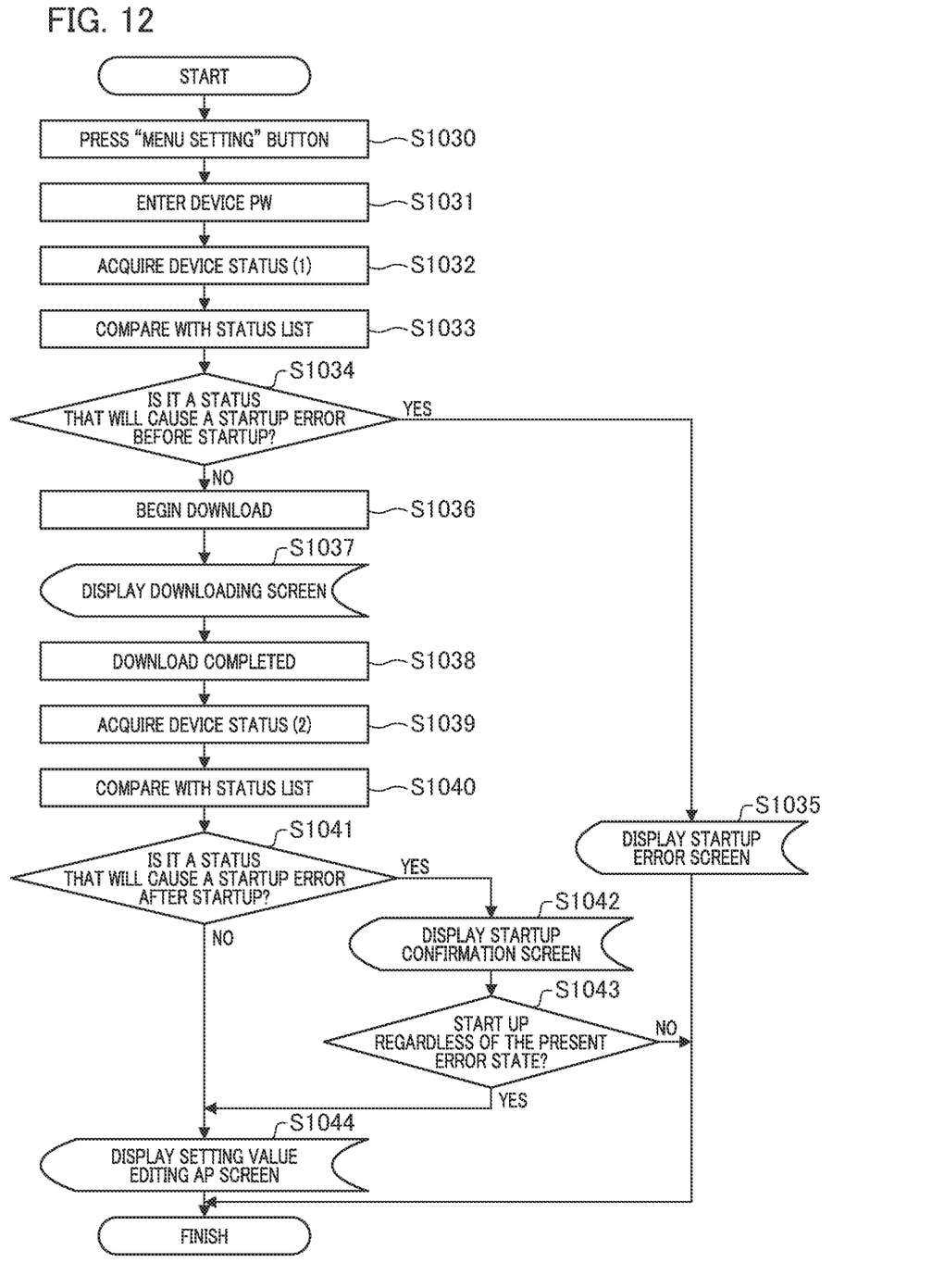
FIG. 12 is a flowchart for the setting value editing application side according to a third embodiment.

FIG. 12 is a flowchart of the setting value editing application 210 side according to the third Embodiment. The processing that is shown in this flowchart is executed by the CPU 201 on the external apparatus 200.

The flow of the processing from S1030 up until S1038 is the same as that of S1012 to S1020 in the second Embodiment, and therefore, explanations thereof will be omitted. Note that the flow of the processing for the flowchart for the device side is also the same as that of the first Embodiment, and therefore, an explanation thereof will also be omitted.

The flow of the processing for S1039 and after in FIG. 12 will now be explained. In S1039, the device status is acquired for the second time. In S1040, the status is compared to the status list table 603 in FIG. 8 (C), and the screen type that should be displayed and the display timing for each type of error are confirmed. The statuses for which the display timing corresponds to "after" are error statuses that should be compared to the list after the download has been completed.

In the case in which the screen type corresponding to the acquired status is a pattern 2 in S10141, a screen 427, which prompts a user confirmation, is displayed instead of an error screen in S1042. When the "yes" button 428 is pressed on the screen 427, the processing will proceed S1044 even if the device is in a state that will naturally cause a startup error. It is thereby possible to display the setting value editing application 210 screen. If the "no" button 429 is pressed, the processing will end without starting up the setting value editing application 210. Note that if the status that is acquired in S1041 is not on the list table 603, the processing will proceed to S1044, and the setting value editing application 210 screen will be displayed.

According to the third Embodiment, it is possible to perform the startup determination for the setting value editing application 210 based on results that have been acquired from the user in order to use a portion of the functions of the setting value editing application 210. It is thereby possible to start up the setting value editing application 210 according to necessity, and to further improve the ease of use for the user. Note that it is possible to save and export the setting value data that has been edited in the setting value editing application 210. It is thereby possible to make the data for the setting values data that will be transmitted to the device again in the case in which the device status is no longer an error status.

While the present invention has been explained above based on preferred Embodiments thereof, the present invention is not limited to these specific Embodiments, and various modes of a scope that do not depart from the spirit or scope of this invention are also included in the present invention. In addition, portions of the above-described Embodiments may be suitably combined.

The items that are displayed in the field 411 of the list of the downloaded device setting information are not limited to the above-described Embodiments. In addition, the items that are displayed in the lists of the device setting information are also not limited to the above-described Embodiments. Additionally, the PC in the above-described Embodiments may also be a portable terminal.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098269, filed Jun. 11, 2021, which is hereby incorporated by reference herein in its entirety.

What is claimed is:

1. An information processing system configured to perform setting for an image processing apparatus based on setting edited by an application configured to operate on an information processing apparatus, the information processing system comprising:
   a memory storing instructions; and
   a processor executing the instructions causing the information processing system to:
      acquire a status for the image processing apparatus;
      determine whether or not to start up the application, wherein the determination is performed based on whether or not the acquired status corresponds to one of designated statuses by referencing a list that regulates the designated statuses;
      control the startup of the application based on results of the determination, wherein after the startup of the application, setting information is downloaded from the image processing apparatus using the application; and
      display a screen corresponding to the acquired status in the case in which it has been determined not to start up the application based on results of the determination.

2. The information processing system according to claim 1, wherein
   the determination is performed based on both the status before the setting information download has begun, and the status after the setting information download has been completed.

3. The information processing system according to claim 1, wherein
   the list further regulates a screen type and display timing for the displayed screen corresponding to the designated statuses.

4. The information processing system according to claim 1, wherein the displayed screen is an error screen without downloading of the setting information.

5. The information processing system according to claim 1, wherein the displayed screen is a confirmation screen that confirms with a user as to whether or not to start up the.

6. The information processing system according to claim 5, wherein
   the processor further executes instructions causing the information processing system to: have the user input whether it is possible to start up the application in the case in which the confirmation screen has been displayed; and
   start up the application in the case in which it has been input that it is possible to start up the application.

7. The information processing system according to claim 1, wherein
   the setting information download is not performed in the case in which it has been determined not to start up the application before the setting information download has begun.

8. The information processing system according to claim 1, wherein
   the list regulates at least one of (a) when a specific screen is open on an operations panel of this device (when functions are being set or registered), (b) the application is connecting for remote setup for another PC, (c) when a software with a security protection function is in operation, and (d) when a device error is occurring, as the designated statuses.

9. An information processing apparatus including an application, and which is configured to perform setting for an image processing apparatus based on setting edited by the application, the information processing apparatus comprising:
   a memory storing instructions; and
   a processor executing the instructions causing the information processing apparatus to:
   acquire a status for the image processing apparatus;
   determine whether or not to start up the application, wherein the determination is performed based on whether or not the acquired status corresponds to one of designated statuses by referencing a list that regulates the designated statuses;
   control the startup of the application based on results of the determination, wherein, after the startup of the application, setting information is downloaded from the image processing apparatus using the application; and
   displaying a screen corresponding to the acquired status in the case in which it has been determined not to start up the application based on results of the determination.

10. An information processing method that performs setting for an image processing apparatus based on setting edited by an application configured to operate on an information processing apparatus, the method comprising:
   acquiring a status for the image processing apparatus;
   determining whether or not to start up the application, wherein the determination is performed based on whether or not the acquired status corresponds to one of designated statuses by referencing a list that regulates the designated statuses;
   controlling the startup of the application based on results of the determination, wherein, after the startup of the application, setting information is downloaded from the image processing apparatus using the application; and
   displaying a screen corresponding to the acquired status in the case in which it has been determined not to start up the application based on results of the determination.

11. A non-transitory storage medium on which is stored a computer program related to an information processing method, which performs setting for an image processing apparatus based on setting edited by an application configured to operate on an information processing apparatus, the method comprising:
   acquiring a status for the image processing apparatus;
   determining whether or not to start up the application, wherein the determination is performed based on whether or not the acquired status corresponds to one of designated statuses by referencing a list that regulates the designated statuses;
   controlling the startup of the application based on results of the determination, wherein after the startup of the application, setting information is downloaded from the image processing apparatus using the application; and
   displaying a screen corresponding to the acquired status in the case in which it has been determined not to start up the application based on results of the determination.

* * * * *